United States Patent
Gu et al.

(10) Patent No.: US 9,933,979 B2
(45) Date of Patent: Apr. 3, 2018

(54) DEVICE AND METHOD FOR STORING DATA IN DISTRIBUTED STORAGE SYSTEM

(71) Applicant: Samsung Electronics Co., Ltd., Suwon-si, Gyeonggi-do (KR)

(72) Inventors: Bon-Cheol Gu, Seongnam-si (KR); Ju-Pyung Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/645,005

(22) Filed: Mar. 11, 2015

(65) Prior Publication Data
US 2015/0261466 A1  Sep. 17, 2015

(30) Foreign Application Priority Data

Mar. 12, 2014 (KR) .................. 10-2014-0029005

(51) Int. Cl.
*G06F 12/00* (2006.01)
*G06F 3/06* (2006.01)

(52) U.S. Cl.
CPC ............ *G06F 3/067* (2013.01); *G06F 3/0608* (2013.01); *G06F 3/0641* (2013.01)

(58) Field of Classification Search
CPC ...... G06F 3/0619; G06F 3/0689; G06F 3/067; G06F 3/0665
See application file for complete search history.

(56) References Cited

U.S. PATENT DOCUMENTS

| | | | |
|---|---|---|---|
| 8,140,491 B2 | 3/2012 | Mandagere et al. | |
| 8,495,304 B1* | 7/2013 | Natanzon | G06F 11/1453 711/133 |
| 2004/0034671 A1* | 2/2004 | Kodama | G06F 9/4416 |
| 2006/0059171 A1* | 3/2006 | Borthakur | G06F 17/30067 |
| 2010/0042790 A1* | 2/2010 | Mondal | G06F 3/0608 711/161 |
| 2010/0082547 A1* | 4/2010 | Mace | G06F 11/1435 707/648 |
| 2010/0223441 A1 | 9/2010 | Lillibridge et al. | |
| 2011/0219205 A1 | 9/2011 | Wright | |
| 2012/0124282 A1 | 5/2012 | Frank et al. | |
| 2013/0091111 A1 | 4/2013 | Tofano | |

FOREIGN PATENT DOCUMENTS

KR      20120016747 A      2/2012

* cited by examiner

*Primary Examiner* — Larry T Mackall
(74) *Attorney, Agent, or Firm* — Harness, Dickey & Pierce, P.L.C.

(57) ABSTRACT

The data storage device includes a separator configured to separate data requested to write by clients into data chunks, an address translator configured to translate first addresses generated by the data chunks into second addresses as global addresses, a storage node mapper configured to map the second addresses to a plurality of storage nodes, and a data store unit configured to select a target storage node among the plurality of storage nodes and store the data chunks in the target storage node. The data chunks include a plurality of data input/output unit blocks. If other data chunks that are the same with the data chunks are pre-stored in the plurality of storage nodes, the data store unit is configured to establish links between the same pre-stored data chunks and the second addresses, rather than stores the data chunks in the plurality of storage nodes.

18 Claims, 17 Drawing Sheets

FIG. 4

| | ADDRESS |
|---|---|
| CLIENT ADDRESS<br>(offset, length) | (30, 200) |
| CLIENT ADDRESS<br>WITH CID<br>(CID, offset, length) | (0, 30, 70), (1, 0, 100), (2, 0, 30) |
| GLOBAL ADDRESS<br>(GID, offset, length) | (23, 30, 70), (17, 0, 100), (29, 0, 30) |
| TARGET ADDRESS<br>(SID, GID, offset, length) | (1, 23, 30, 70), (0, 17, 0, 100), (2, 29, 0, 30) |

ADDRESS TRANSLATING TABLE

| CID | GID |
|-----|-----|
| 0 | 23 |
| 1 | 17 |
| 2 | 29 |
| ⋮ | ⋮ |

STORAGE NODE MAPPING TABLE

| GID | SID |
|-----|-----|
| 17  | 0   |
| 23  | 1   |
| 29  | 2   |
| ⋮   | ⋮   |

FIG. 12

| | | | | | | | | | | | | |
|---|---|---|---|---|---|---|---|---|---|---|---|---|
DATA CONTENTS (500): | # | ! | / | u | s | r | / | b | i | n | / | e | n | v |

| | ! | | # | | / | | b | | e | | i | | n | | r | s | | u | v | |
|---|---|---|---|---|---|---|---|---|---|---|---|---|---|---|---|---|---|---|---|---|
SYMBOL OCCURRENCE VECTOR (510) | ··· | 33 | ··· | 35 | ··· | 47 | ··· | 98 | ··· | 101 | ··· | 105 | ··· | 110 | ··· | 114 | 115 | ··· | 117 | 118 | ··· |
| | 0 | 1 | 0 | 1 | 0 | 3 | 0 | 1 | 0 | 1 | 0 | 1 | 0 | 2 | 0 | 1 | 1 | 0 | 1 | 1 | 0 |

SYMBOL INDEX
FREQUENCY

DEVICE AND METHOD FOR STORING DATA IN DISTRIBUTED STORAGE SYSTEM

CROSS-REFERENCE TO RELATED APPLICATION

This application claims priority from Korean Patent Application No. 10-2014-0029005 filed on Mar. 12, 2014 in the Korean Intellectual Property Office, and all the benefits accruing therefrom under 35 U.S.C. 119, the contents of which in its entirety are herein incorporated by reference.

BACKGROUND

1. Field of the Inventive Concepts

The present inventive concepts relates to a device and/or a method for storing data in a distributed storage system.

2. Description of the Related Art

According to advances in the performance of a computer system including a distributed storage system, the volume of data processed in the computer system may also increase and there is a desire for securing a data storage space. In particular, in a distributed storage system storing high capacity data, expanding equipment for securing a data storage space may, however, cost a great deal.

Accordingly, it is desirable to suppress squandering of storage space by efficiently managing a given storage space. To this end, a variety of measures for processing duplicated data of the same content in data management are being explored.

SUMMARY

Some embodiments provide a distributed storage device for eliminating duplicate data in a distributed storage system.

Some embodiments provide a distributed storage device for efficiently eliminating duplicate data.

Some embodiments provide a distributed storage method for eliminating duplicate data in a distributed storage system.

According to one embodiment, there is provided a data storage device including a separator configured to separate data requested to write by clients into data chunks, an address translator configured to translate first addresses generated by the data chunks into second addresses as global addresses, a storage node mapper configured to map the second addresses to a plurality of storage nodes, and a data store unit configured to select a target storage node among the plurality of storage nodes and store the data chunks in the target storage node. The data chunks include a plurality of data input/output unit blocks. If other data chunks that are the same with the data chunks are pre-stored in the plurality of storage nodes, the data store unit is configured to establish links between the same pre-stored data chunks and the second addresses, rather than stores the data chunks in the plurality of storage nodes.

According to another embodiment, there is provided a distributed storage device including a separator configured to separate data requested to write by clients into data chunks and map the data chunks to global address spaces, and a storage node mapper configured to map a plurality of storage nodes to global addresses for the data chunks mapped to the global address spaces. The data chucks include including a plurality of data input/output unit blocks. If other data chunks that are the same with the data chunks are pre-stored in the plurality of storage nodes, data input/output operations for the data chunks are performed on the pre-stored data chunks that are the same with the data chunks.

BRIEF DESCRIPTION OF THE DRAWINGS

The above and other features and advantages of the present disclosure will become more apparent by describing in detail preferred embodiments thereof with reference to the attached drawings in which:

FIG. 4 illustrates an address translating process performed in the distributed storage device according to an embodiment of the present disclosure;

FIG. 5A illustrates an address translating table used in an address translating process and FIG. 5B illustrates a storage node mapping table used in the address translating process;

FIGS. 12 and 13 illustrate a process of extracting characteristics of a data chunk;

DETAILED DESCRIPTION OF THE EMBODIMENTS

Figure 1A:
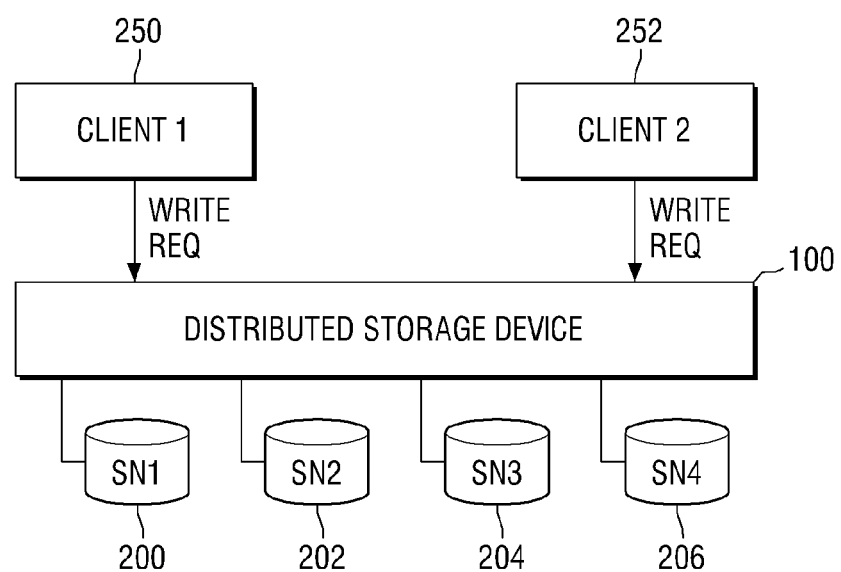
FIGS. 1A and 1B are schematic diagrams for explaining a distributed storage device according to an embodiment of the present disclosure.

Advantages and features of the present inventive concepts and methods of accomplishing the same may be understood more readily by reference to the following detailed description of preferred embodiments and the accompanying drawings. The present inventive concepts may, however, be embodied in many different forms and should not be construed as being limited to the embodiments set forth herein. Rather, these embodiments are provided so that this disclosure will be thorough and complete and will fully convey the concepts of the inventive concepts to those skilled in the art, and the present inventive concepts will only be defined by the appended claims. Like reference numerals refer to like elements throughout the specification.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

Unless otherwise defined, all terms (including technical and scientific terms) used herein have the same meaning as commonly understood by one of ordinary skill in the art to which the present inventive concepts belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 1B:
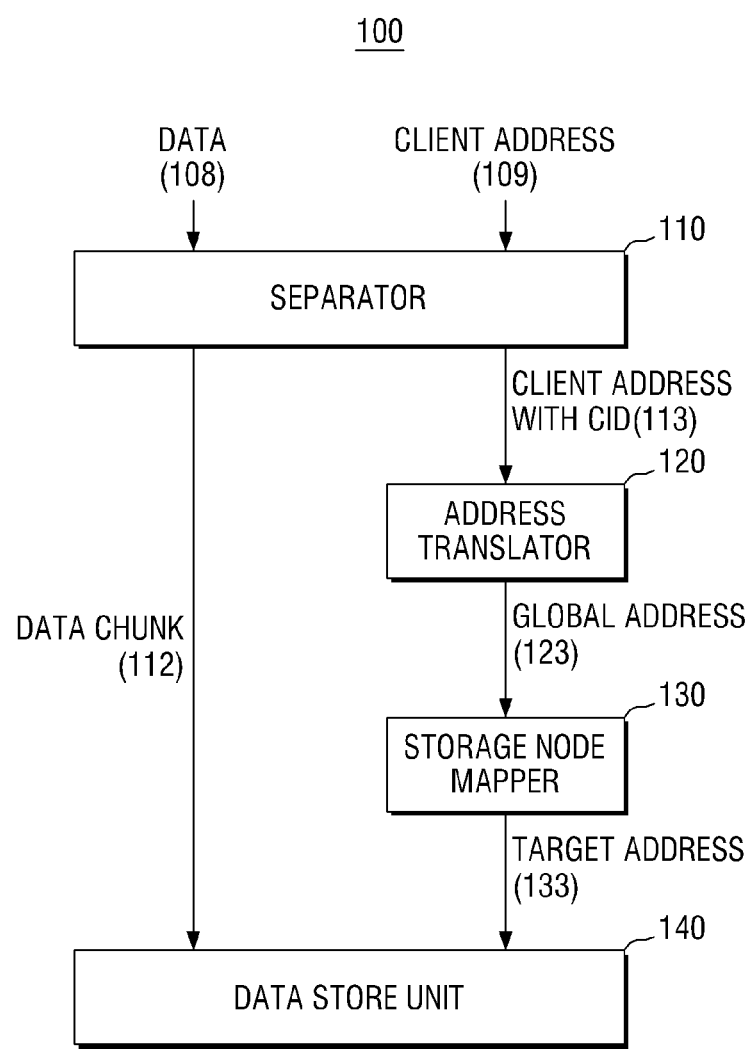

FIGS. 1A and 1B are schematic diagrams for explaining a distributed storage device according to an embodiment of the present disclosure.

Referring to FIG. 1A, the distributed storage device 100 according to an embodiment of the present disclosure receives data input/output requests from one or more clients 250 and 252 and performs data input/output operations. For example, the distributed storage device 100 may allocate and store the data requested to write by the one or more clients 250 and 252 in one or more storage nodes 200, 202, 204 and 206, and may read data requested to read by the one or more clients 250 and 252 from the one or more storage nodes 200, 202, 204 and 206. Then, the distributed storage device 100 may transmit the read data to the clients 250 and 252.

In some embodiments of the present disclosure, the distributed storage device 100 may include a single server or multiple servers. The distributed storage device 100 may further include a metadata management server that manages metadata for the data stored in the storage nodes 200, 202, 204 and 206. The clients 250 and 252 are terminals capable of accessing the distributed storage device 100 through a network. For example, the clients 250 and 252 may include a computer, such as a desktop computer or a server, and mobile devices, such as a cellular phone, a smart phone, a tablet PC, a notebook computer, a personal digital assistant (PDA), but not limited thereto. The storage nodes 200, 202, 204 and 206 may include storage devices, such as a hard disk drive (HDD), a solid state drive (SSD) or a network attached storage (NAS), but not limited thereto. The storage device may include one or more processing units. The clients 250 and 252, the distributed storage device 100 and the storage nodes 200, 202, 204 and 206 may be connected to each other through a wired network, such as a local area network (LAN) or a wide area network (WAN), or a wireless network, such as WiFi, Bluetooth or a cellular network.

Referring to FIG. 1B, the distributed storage device 100 includes a separator 110, an address translator 120, a storage node mapper 130 and a data store unit 140.

The separator 110 separates data 108 requested to write by the clients 250 and 252 into data chunks 112 including a plurality of data input/output unit blocks. The data input/output operations requested by the clients 250 and 252 may be performed in units of the separated data chunks 112. That is to say, the data chunks 112 may serve as basic data units for the clients 250 and 252 to perform input/output operations for the distributed storage device 100. Accordingly, all of data blocks grouped to be included in the same data chunks 112. Thus, data input/output unit blocks, which are to be described later, may be simultaneously processed by one bout of input/output operation.

The data input/output unit blocks constituting the data chunks 112 refer to unit blocks of data processed by the distributed storage device 100 in performing the one bout of the input/output operation, and sizes of the data input/output unit blocks may be determined according to specifications of hardware and software of the distributed storage device 100. For example, if the distributed storage device 100 is a storage device including a flash memory, for example, SSD, the data input/output unit blocks may have sizes of 4 KB to 8 KB. The data chunks 112 include the plurality of data input/output unit blocks. In some embodiments of the present disclosure, the data chunks 112 may have sizes of 1 MB or greater. In some embodiments of the present disclosure, the sizes of the data chunks 112 (e.g., 1 MB or 10 MB) may be configured to have much larger than the sizes of the data input/output unit blocks (e.g., 4 KB or 8 KB), and the data chunks 112 may be referred to as "super chunks".

Meanwhile, the separator 110 translates a client address 109 for addressing data 108 of client into first addresses 113 determined for the respective data chunks 112. The first addresses 113 for addressing one or more data chunks 112 from the data 108 may include chunk IDs (CIDs) for identifying the respective data chunks 112.

The address translator 120 translates the first addresses 113 generated for the respective separated data chunks 112 into second addresses 123 as global addresses used in the distributed storage device 100. The second addresses 123 may address the data stored in the distributed storage device 100 and may include global IDs (GIDs) for identifying global address spaces. For example, the second addresses 123 may address the data stored in the storage nodes 200, 202, 204 and 206 of the distributed storage device 100. Meanwhile, sizes of areas addressed by the global addresses may have the same size with the data chunks 112. For example, when the data chunks 112 have a size of 1 MB, one global address may address 1 MB data chunks. In some embodiments of the present disclosure, the address translator 120 may translate the first addresses 113 into the second addresses 123 using an address translating table 122. The address translating table 122 may be a database table in which CID-GID relationships are stored.

The storage node mapper 130 maps the second addresses 123 to the plurality of storage nodes 200, 202, 204 and 206. In other words, the storage node mapper 130 may map the location of the data addressed by the second addresses 123 in the plurality of storage nodes 200, 202, 204 and 206. Here, the storage nodes 200, 202, 204 and 206 may be identified by storage node IDs (SIDs). In some embodiments of the present disclosure, the storage node mapper 130 may map the second addresses 123 to the storage nodes using a storage node mapping table 132. The storage node mapping table 132 may be a database table in which GID-SID relationships are stored.

The data store unit 140 may select a target storage node among the plurality of storage nodes 200, 202, 204 and 206 to store the data chunks 112 and may store the data chunks 112 in the selected target storage node using a target address 133 for addressing the target storage node. The target storage node may include storage spaces for storing the data chunks 112. In some embodiments of the present disclosure, the storage space for the target storage node may be divided into data storage units fitted to the maximum size of the data chunks 112.

When other data chunks that are the same with the data chunks 112 are pre-stored in the plurality of storage nodes 200, 202, 204 and 206, the data store unit 140 may not store the data chunks 112 in the plurality of storage nodes 200, 202, 204 and 206. In other words, when the same data chunks with the data chunks 112 which are requested to write, the data store unit 140 establishes links between the same data chunks pre-stored in the plurality of storage nodes 200, 202, 204 and 206 and the second addresses 133, rather than stores the data chunks 112 over the data chunks pre-stored in the plurality of storage nodes 200, 202, 204 and 206.

Figure 2:
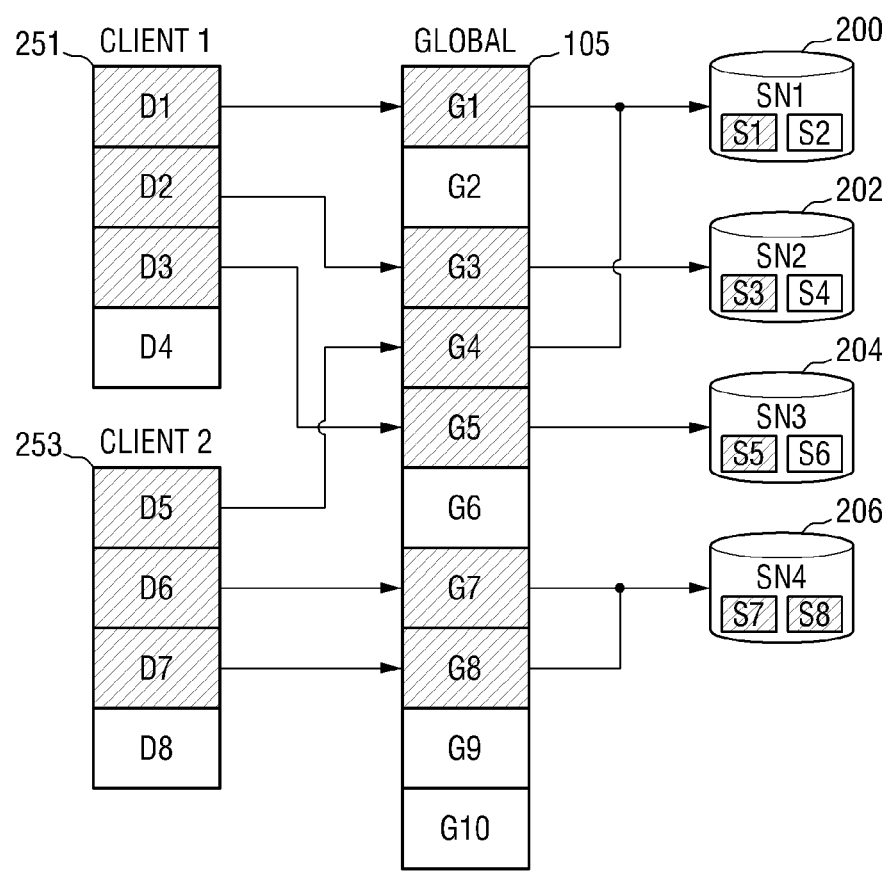
FIG. 2 is a schematic diagram illustrating a distributed storage device according to an embodiment of the present disclosure and address spaces of clients.

FIG. 2 is a schematic diagram illustrating a distributed storage device according to an embodiment of the present disclosure and address spaces of clients.

Referring to FIG. 2, the distributed storage device 100 according to an embodiment of the present disclosure includes a global address space 105. The global address space 105 addresses the data to one or more storage nodes 200, 202, 204 and 206. For example, the global address space 105 includes global addresses G1 to G10. The global addresses G1 and G4 may address the storage node 200, the global address G3 may address the storage node 202, the global address G5 may address the storage node 204, and the global addresses G7 and G8 may address the storage node 206. Meanwhile, the clients 250 and 252 include clients address spaces 251 and 253 in which local data of clients can be accessed, and the client address spaces 251 and 253 may include clients addresses D1 to D4 and D5 to D8, respectively.

Each of the storage nodes 200, 202, 204 and 206 may include one or more data storage spaces. For example, the storage node 200 may include data storage spaces S1 and S2, the storage node 202 may include data storage spaces S3 and S4, the storage node 204 may include data storage spaces S5 and S6, and the storage node 206 may include data storage spaces S7 and S8. Here, the client address D1 may be translated into the global address G1, the client address D5 may be translated into the global address G4, and the global addresses G1 and G5 may be mapped to the same storage node 200. When the data chunk addressed to the client address D1 and the data chunk addressed to the client address D5 are the same with each other, in order to efficiently use data storage spaces, the distributed storage device 100 may store the data chunks in a single storage space S1 of the storage node 200 just once.

Meanwhile, in some embodiments of the present disclosure, the distributed storage device 100 may further include a buffer that buffers the data chunks. When data input/output requests for data chunks that are the same with other data chunks existing in the buffer are received from the clients 250 and 252, data input/output operations for the data chunks may be performed using the buffer.

Hereinafter, an address translating process performed in the distributed storage device 100 according to an embodiment of the present disclosure will be described with reference to FIGS. 3 to 5B.

Figure 3:
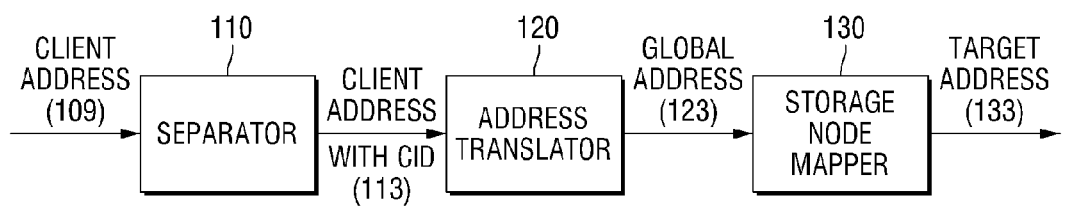
FIG. 3 is a schematic diagram for explaining an address translating process performed in the distributed storage device according to an embodiment of the present disclosure.

FIG. 3 is a schematic diagram for explaining an address translating process performed in the distributed storage device according to an embodiment of the present disclosure, FIG. 4 illustrates an address translating process performed in the distributed storage device according to an embodiment of the present disclosure, and FIG. 5A illustrates an address translating table used in an address translating process and FIG. 5B illustrates a storage node mapping table used in the address translating process.

Referring to FIGS. 3 and 4, the client address 109 for addressing the data 108 of client may be translated into first addresses 113 by the separator 110, and the first addresses 113 may include chunk IDs (CIDs) for identifying the respective data chunks 112. In some embodiments of the present disclosure, the client address 109 may include information concerning offsets and lengths of the data 108. For example, when the client address is "(30, 200)", the client address spaces 251 and 253 may have an offset of '30' and a data length of '200'. The translated first addresses 113 may include information concerning CIDs, offsets and lengths for the respective data chunks 112. For example, when the client address of the data 108 is set to "(30, 200)" and the size of the data chunks 112 is set to '100', the data 108 may be separated into three data chunks having a size of '100'. Since the data 108 has an offset of '30', the three data chunks separated from the data 108 may be translated into three first addresses, that is, "(0, 30, 70)", "(1, 0, 100)", and "(2, 0, 30)". That is to say, the data chunk having a CID of '0' has an offset of '30' and a length of '70', the data chunk having a CID of '1' has an offset of '0' and a length of '100', and the data chunk having a CID of '2' has an offset of '0' and a length of '30'.

The first addresses 113 are translated into second addresses 123 as global addresses used in the distributed storage device 100 by the address translator 120. The translated second addresses 113 may include information concerning GIDs, offsets and lengths for the respective data chunks 112. For example, second addresses of data chunks having the three first addresses "(0, 30, 70)", "(1, 0, 100)", and "(2, 0, 30)" may be "(23, 30, 70)", "(17, 0, 100)", and "(29, 0, 30)". That is to say, the data chunk having a CID of '0' is mapped to a global address space having a GID of '23', the data chunk having a CID of '1' is mapped to a global address space having a GID of '17', and the data chunk having a CID of '2' is mapped to a global address space having a GID of '29'. The translation of the first addresses 113 into the second addresses 123 may be performed using an address translating table 122 shown in FIG. 5A.

The second addresses 123 are translated into the target address 133 by the storage node mapper 130. The translated target address 133 may include information concerning SIDs, GIDs, offsets and lengths for the respective data chunks 112. For example, target addresses of the data chunks having second addresses of "(23, 30, 70)", "(17, 0, 100)", and "(29, 0, 30)" may be "(1, 23, 30, 70)", "(0, 17, 0, 100)", and "(2, 29, 0, 30)". That is to say, the data chunk having a GID of '23' is mapped to a storage node having an SID of '1', the data chunk having a GID of '17' is mapped to a storage node having an SID of '0', and the data chunk having a GID of '29' is mapped to a storage node having an SID of '2'. The translation of the second addresses 123 into the target addresses may be performed using a storage node mapping table 132 shown in FIG. 5B.

Figure 6:
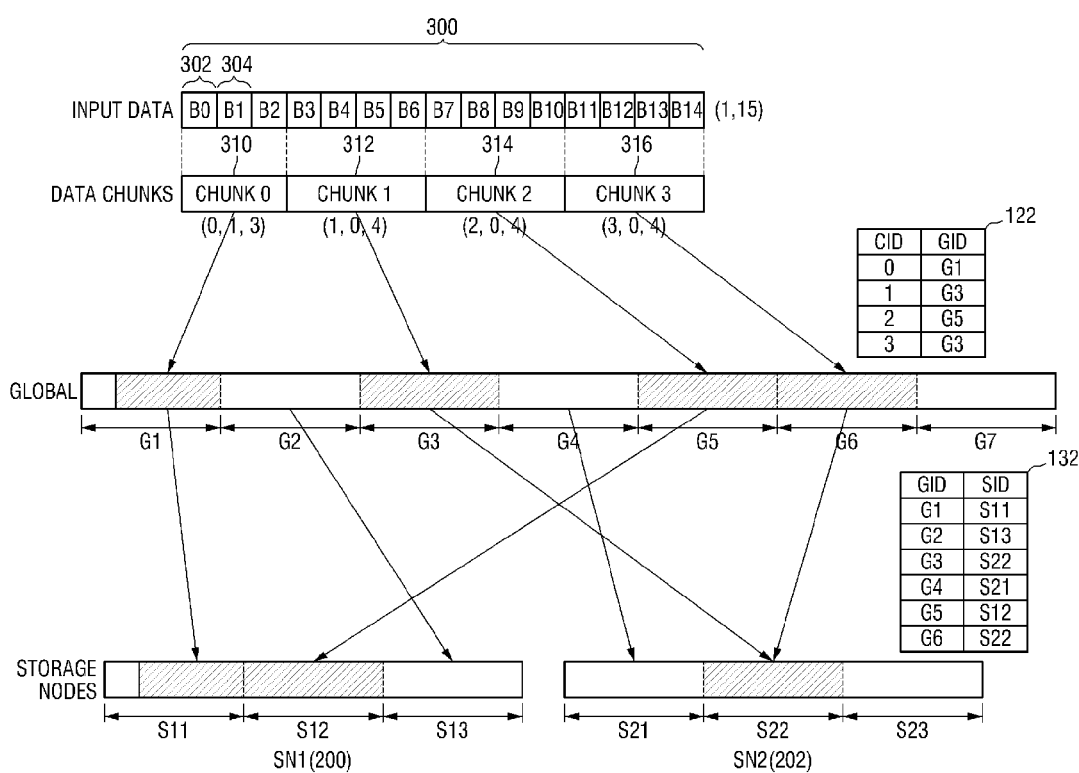
FIG. 6 illustrates a data storage method according to an embodiment of the present disclosure.

FIG. 6 illustrates a data storage method according to an embodiment of the present disclosure.

Referring to FIG. 6, input data 300 requested to write may include fifteen data input/output unit blocks B0 to B14, and a client address of the input data 300 may be "(1, 15)". Accordingly, the input data 300 has an offset of '1' and a length of '15'. The input data 300 may be separated into four data chunks 310, 312, 314 and 316 by the separator 110. In some embodiments of the present disclosure, the data chunks 310, 312, 314 and 316 may be formed by combining the plurality of data input/output unit blocks B0 to B14 that are sequentially and consecutively arranged in the write-requested input data 300. For example, the data chunk 310 may be formed by combining the sequentially and consecutively arranged data input/output unit blocks B0, B1 and B2, and the data chunk 312 may be formed by combining the sequentially and consecutively arranged data input/output unit blocks B3, B4, B5 and B6. Here, first addresses of the data chunk 310 may be "(0, 1, 3)", "(1, 0, 4)", "(2, 0, 4)", and "(3, 0, 4)".

The respective first addresses may be translated into second addresses "(G1, 1, 3)", "(G3, 0, 4)", "(G5, 0, 4)", and "(G6, 0, 4)" by the address translator 120. As described above, the translation may be performed using relationships between the first addresses and the second addresses, that is, using the address translating table 122 in which CID-GID relationships are stored. Next, the respective second addresses may be translated into target addresses "(S11, G1, 1, 3)", "(S22, G3, 0, 4)", "(S12, G5, 0, 4)", and "(S22, G6, 0, 4)". As described above, the translation may be performed using relationships between the second addresses and the target addresses, that is, using the storage node mapping table 132 in which GID-SID relationships are stored.

Accordingly, the data chunk 310 is stored in a region of the storage node 200 addressed to 'S11', the data chunk 312 is stored in a region of the storage node 202 addressed to 'S22', and the data chunk 314 is stored in a region of the storage node 200 addressed to 'S12'. In the illustrated embodiment, it is assumed that the data chunk 316 is the same with the data chunk 312. In this case, the data chunk 316 is not further stored in a storage node. Instead, 'S22' is linked to the second address "(G6, 0, 4)", and the data chunk 316 is mapped to the second address "(G6, 0, 4)" to perform a write operation.

Therefore, when the data chunk 312 and the data chunk 316 are the same with each other, the global addresses 'G3' and 'G6' may address 'S22' of the same storage node.

Figure 7:
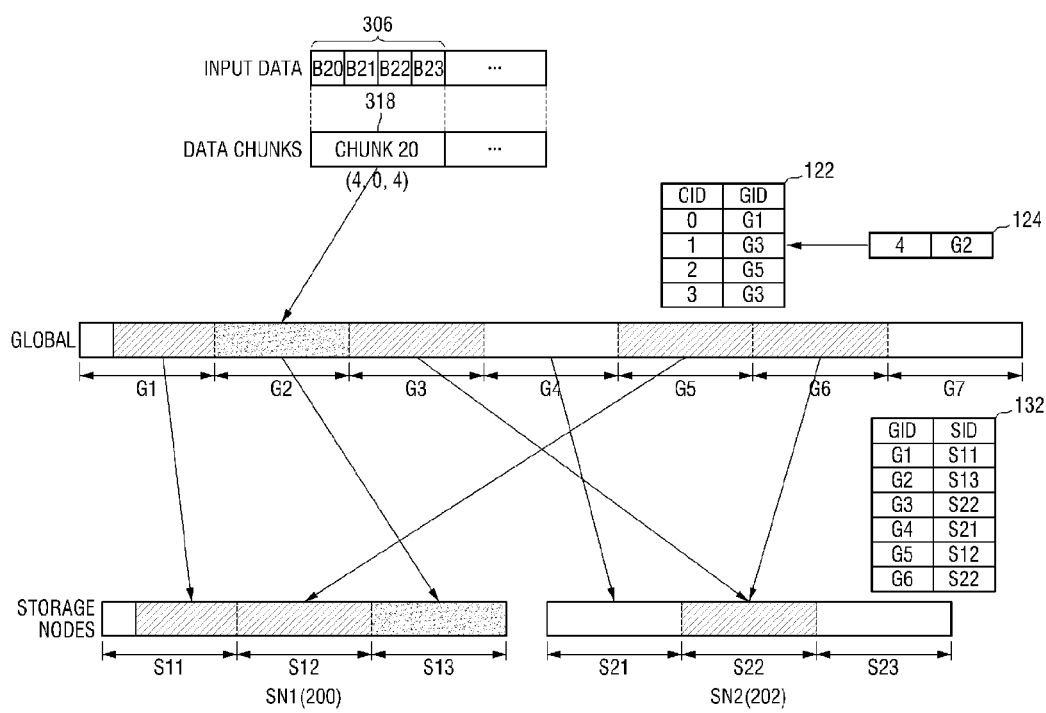
FIG. 7 illustrates a data storage method according to another embodiment of the present disclosure.
Figure 8:
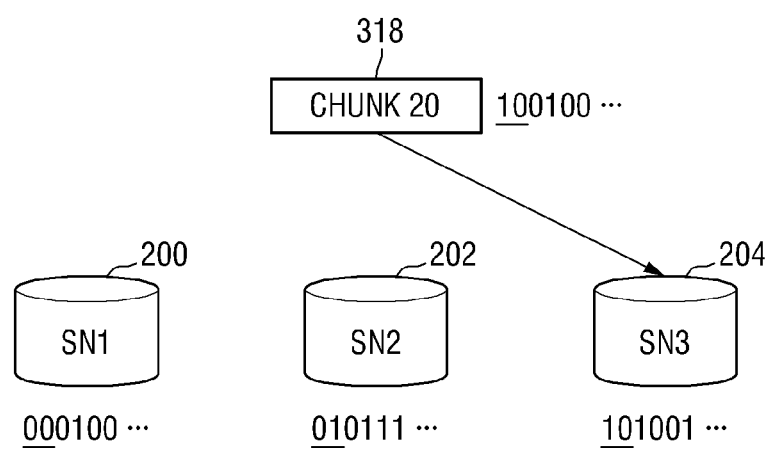
FIG. 8 illustrates a process of selecting a storage node for storing a data chunk.

FIG. 7 illustrates a data storage method according to another embodiment of the present disclosure and FIG. 8 illustrates a process of selecting a storage node for storing a data chunk.

Referring to FIG. 7, input data 306 is additionally requested to write in the distributed storage device 100 shown in FIG. 6. The input data 306 additionally requested to write may include four input/output unit blocks B20 to B23. The separator 110 produces a data chunk 318 including the four input/output unit blocks B20 to B23. Here, a first address of the data chunk 318 is "(4, 0, 4)". The first address may be translated into a second address "(G2, 0, 4)" by the address translator 120. Here, since there is no entry having a CID of '4' in the address translating table 122, a new record 124 may be added to the address translating table 122. Next, since 'G2' indicates 'S13', the data chunk 318 may be stored in a region of the storage node 200 referenced as 'S13'.

Referring to FIG. 8, for each of the plurality of storage nodes 200, 202, 204 and 206, the data store unit 140 analyzes data similarity of the data chunks stored in the plurality of storage nodes 200, 202, 204 and 206, and the data chunk 318 requested to write and selects the storage node 204 having the highest data similarity as a target storage node. In some embodiments of the present disclosure, for each of the plurality of storage nodes 200, 202, 204 and 206, the data store unit 140 generates data having a representative distribution characteristic based on distribution characteristics of the data chunks stored in the plurality of storage nodes 200, 202, 204 and 206, analyzes data similarity of the representative distribution characteristic data and the data chunk 318, and selects a storage node having the highest data similarity as the target storage node.

For example, when the data chunk 318 is "100100 . . . " and representative distribution characteristic data of the storage nodes 200, 202 and 204 are "000100 . . . ", "010111 . . . ", and "101001 . . . ", respectively, the storage node 204 indicated by "101001 . . . " may be selected as a storage node for storing the data chunk 318. Here, the representative distribution characteristic data is data reflecting a pattern of high frequency or a distribution of high frequency among data stored in a storage node. For example, the expression that the representative distribution characteristic data of the storage node 200 is "000100 . . . " may mean that most of the data stored in the storage node 200 have 0's as first bits thereof and most of the data stored in the storage node 200 have 0's as second bits thereof. That is to say, the representative distribution characteristic data may become a standard for determining a representative patterns of data stored in the corresponding storage node.

Figure 9:
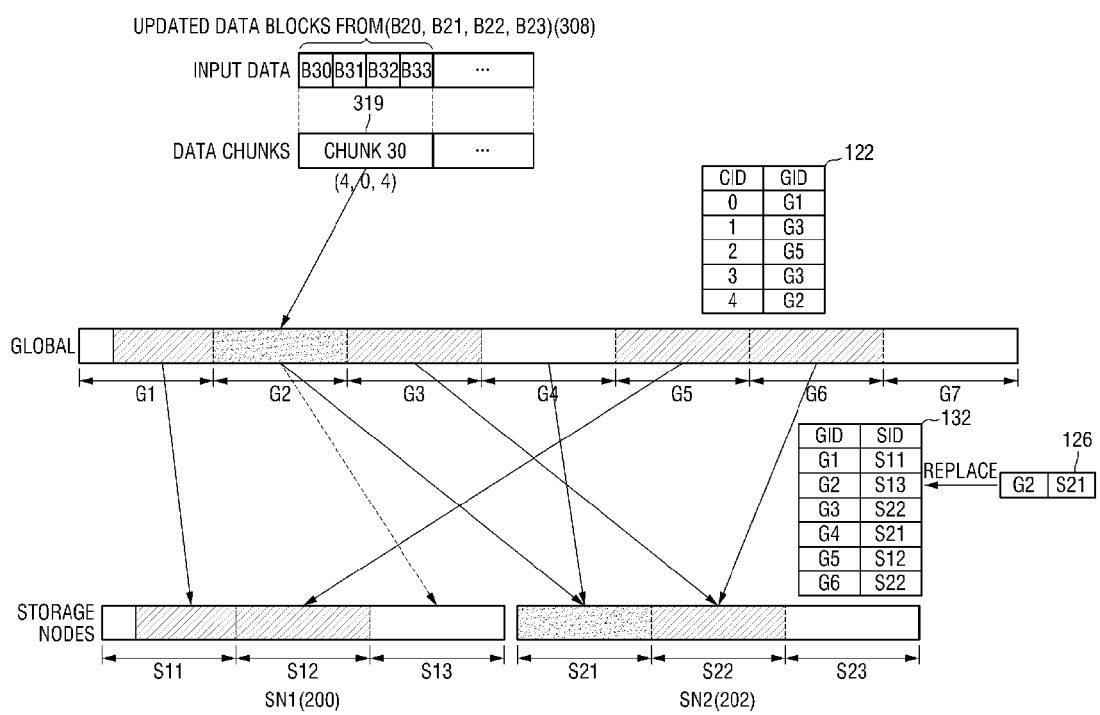
FIG. 9 illustrates a data storage method according to still another embodiment of the present disclosure.

FIG. 9 illustrates a data storage method according to still another embodiment of the present disclosure.

Referring to FIG. 9, the data chunk 318 stored in the distributed storage device 100 shown in FIG. 7 is updated to a data chunk 319. The data chunk 319 may include four updated data input/output unit blocks B30 to B33 derived from four input/output unit blocks B20 to B23. Here, a first address of the data chunk 319 may be "(4, 0, 4)", like the data chunk 318. The first address may be translated into a second address "(G2, 0, 4)" by the address translator 120. Here, since there is an entry having a CID of '4' in the address translating table 122, a new record may not be necessarily added to the address translating table 122. Next, since 'G2' indicates 'S13', the data chunk 319 may be stored in a region of the storage node 200 referenced as 'S13'.

Here, when the data chunk stored in the storage node 200 is altered, the data store unit 110 re-analyzes data similarity between the data chunk 319 and representative distribution characteristic data of each of the plurality of storage nodes 200, 202, 204 and 206, and migrates the data chunk 319 to 'S21' of the storage node 202 that is determined to have the highest data similarity. Here, ('G2', 'S13') of the storage node mapping table 132 may be altered to ('G2', 'S21'). However, in some embodiments of the present disclosure, when the data chunk 318 is only partially altered, the partially altered data chunk 318 retains its originally stored position of the storage node, rather than re-analyzes the data similarity to migrate the data chunk 318 to the storage node 202.

Figure 10:
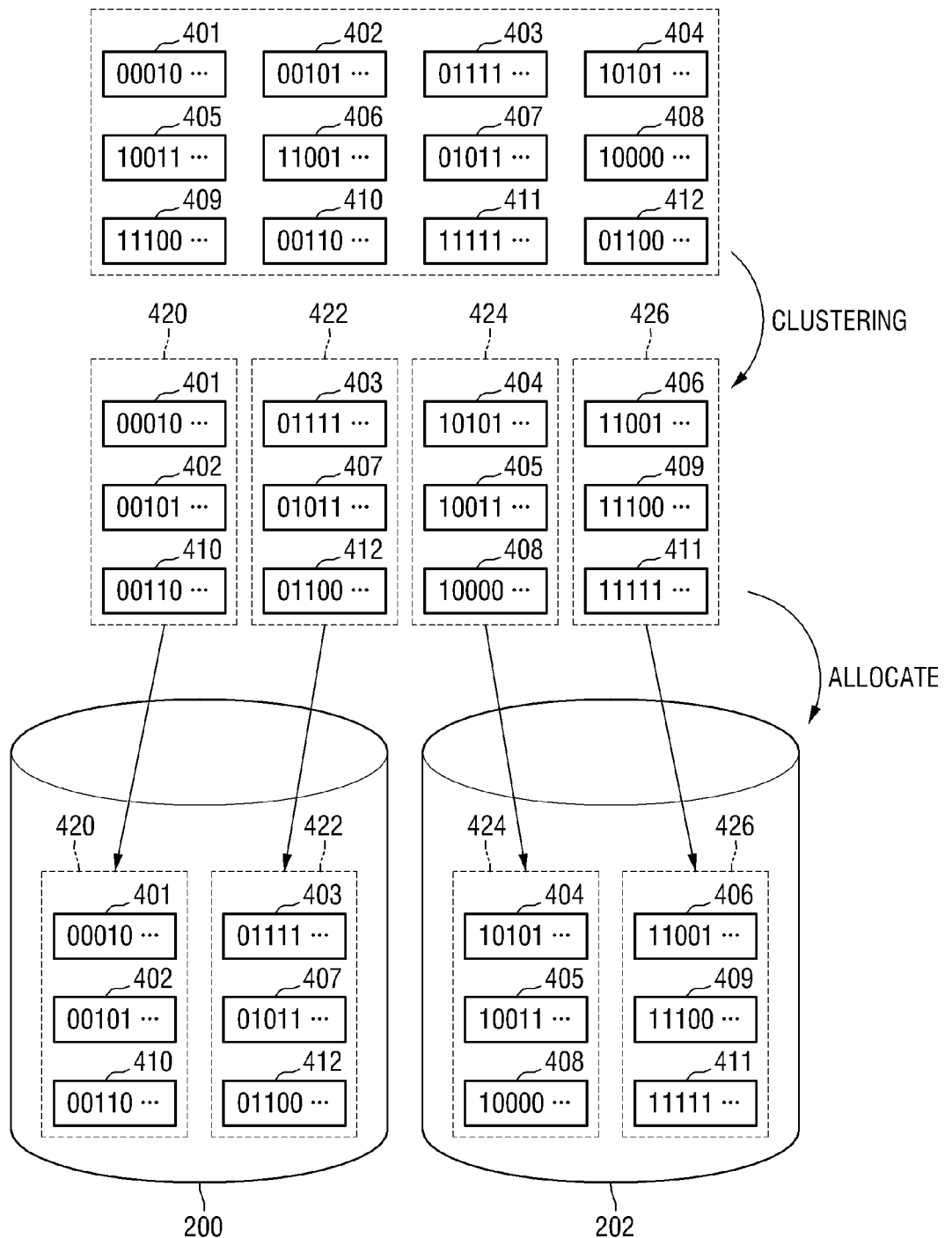
FIG. 10 illustrates a process of clustering distributed data in a storage node.

FIG. 10 illustrates a process of clustering distributed data in a storage node.

Referring to FIG. 10, the distributed storage device 100 periodically performs clustering on the data chunks 401 to 412. A first cluster 420 including the data chunks 401, 402 and 410, a second cluster 422 including the data chunks 403, 407 and 412, a third cluster 424 including the data chunks 404, 405 and 408, and a fourth cluster 426 including the data chunks 406, 409 and 411 may be stored in the storage nodes 200 and 202. In such a manner, data chunks having high similarity with respect to each other may be allocated in locations adjacent to each other by clustering.

Figure 11:
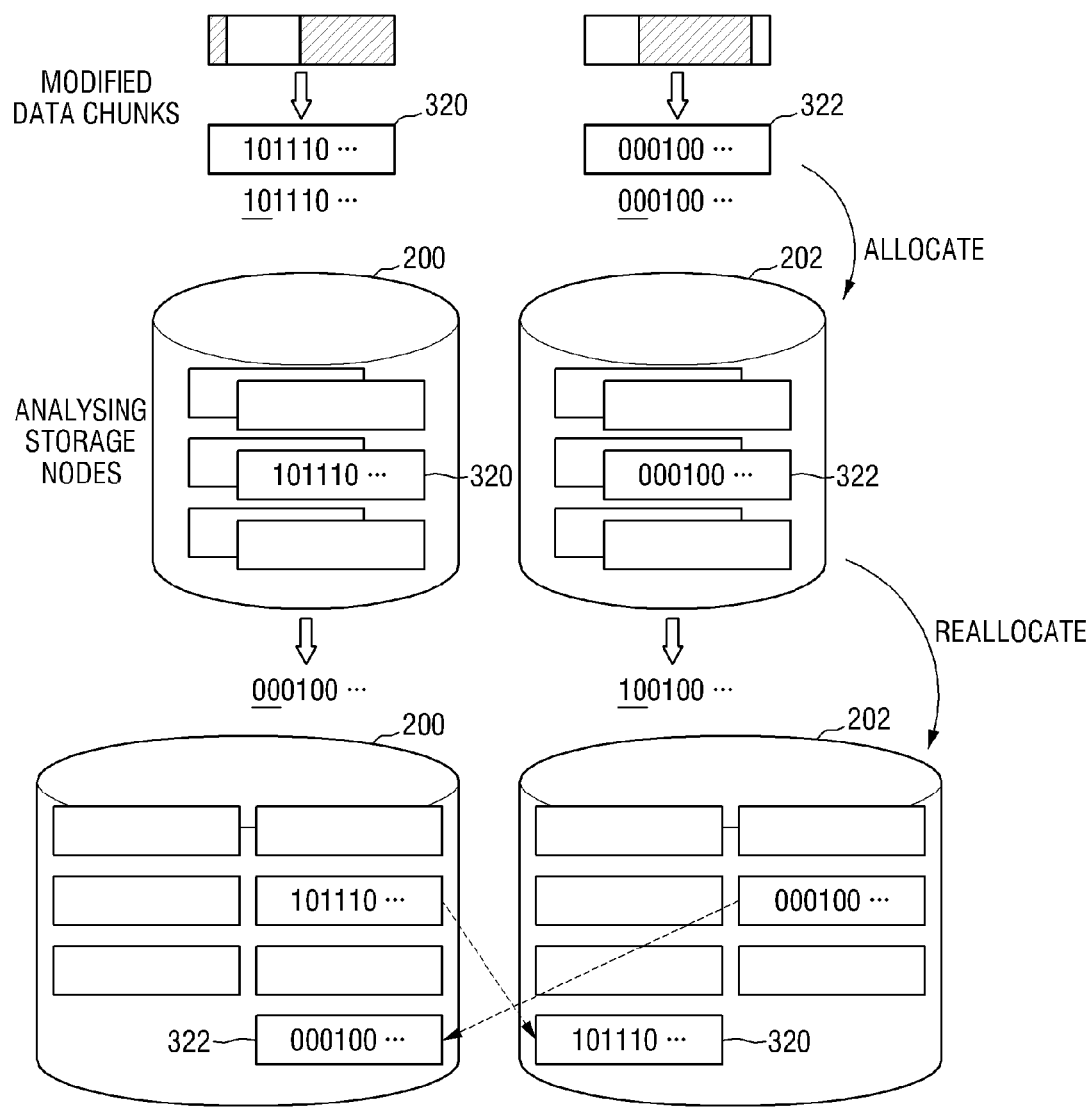
FIG. 11 illustrates a process of redistributing an altered data chunk in a storage node.

FIG. 11 illustrates a process of redistributing an altered data chunk in a storage node.

Referring to FIG. 11, when the data chunks 320 and 322 are altered, the distributed storage device 100 migrates the data chunk 320 stored in the storage node 200 to the storage node 202, and the data chunk 322 stored in the storage node 202 to the storage node 200 for data chunk redistribution.

Figure 13:
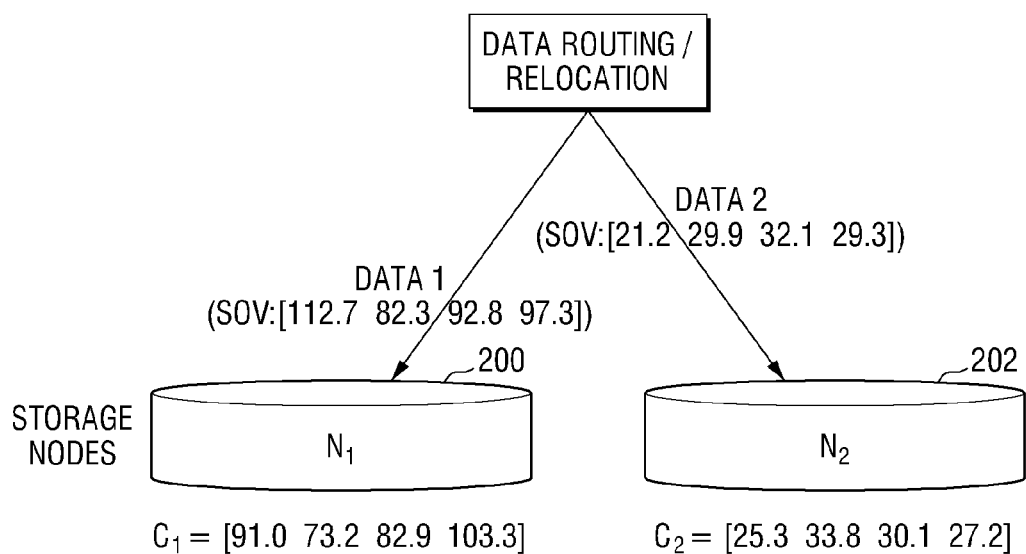

FIGS. 12 and 13 illustrate a process of extracting characteristics of a data chunk.

Referring to FIGS. 12 and 13, contents of a data chunk 500 are divided on a symbol basis, and a symbol occurrence vector 510 has records of symbol occurrence frequencies. That is to say, an intrinsic index value is imparted to each symbol, and numbers of symbol occurrence frequencies are recorded in positions of corresponding symbol. In some embodiments of the present disclosure, representative distribution characteristic data may be acquired by obtaining the average of the symbol occurrence vector 510 of data stored in a pertinent storage node. Then, data chunk relocation may be determined using a distance between the representative distribution characteristic data of each storage node and the symbol occurrence vector 510. For example, when the representative distribution characteristic data obtained from the data stored in the storage node 200 is [91.0, 73.2, 82.9, 103.3] and the representative distribution characteristic data of the storage node 202 is [25.3, 33.8, 30.1, 27.2], since the data chunk having the symbol occurrence vector 510 of [112.7, 82.3, 92.8, 97.3] is closer to the representative distribution characteristic data of the storage node 200, the data chunk is allocated to the storage node 200. Meanwhile, since the data chunk having the symbol occurrence vector 510 of [21.2, 29.9, 32.1, 29.3] is closer to the representative distribution characteristic data of the storage node 202, the data chunk is allocated to the storage node 202.

Figure 14:
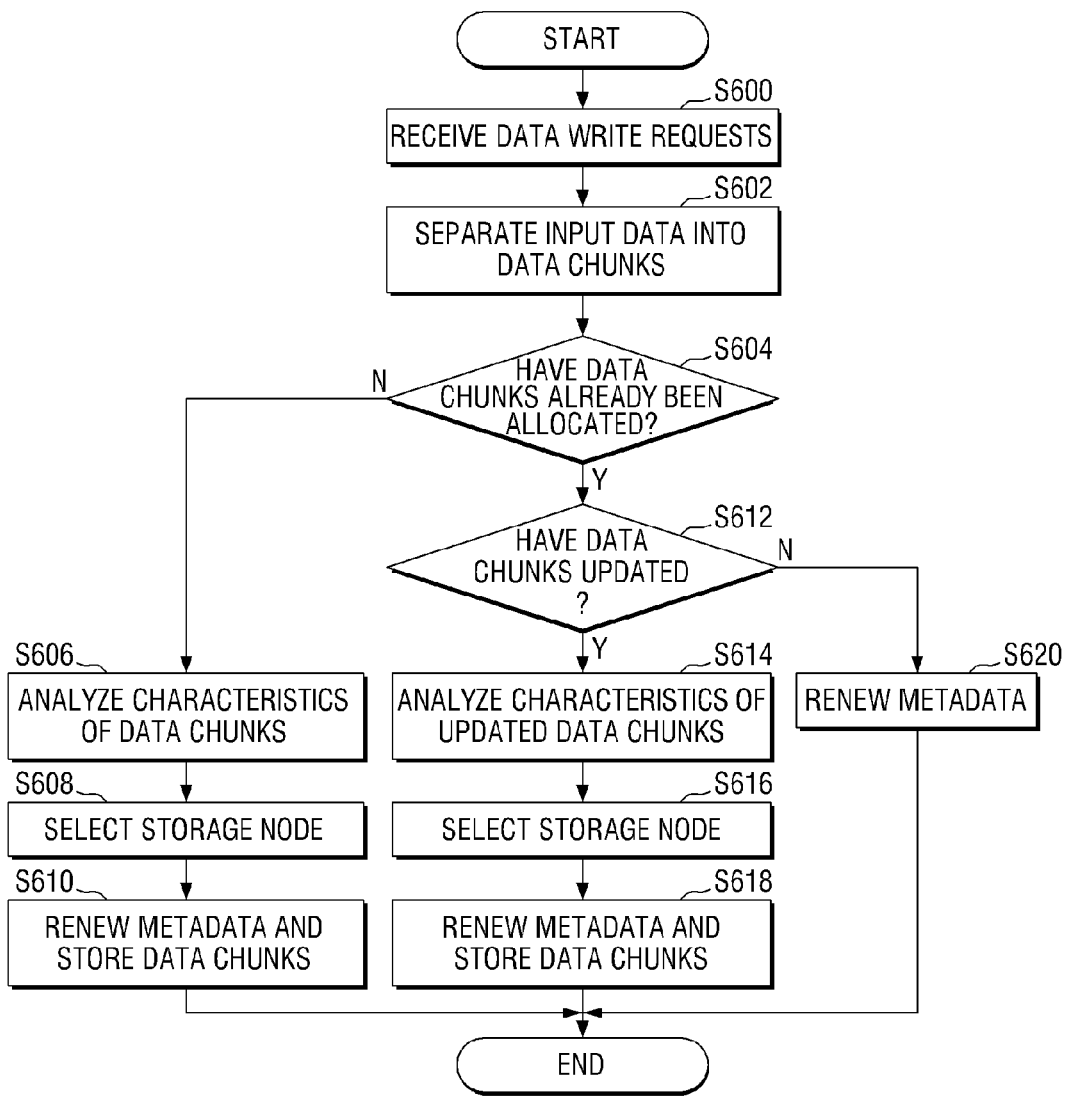
FIG. 14 is a flowchart for explaining a distributed storage method according to an embodiment of the present disclosure.
Figure 15:
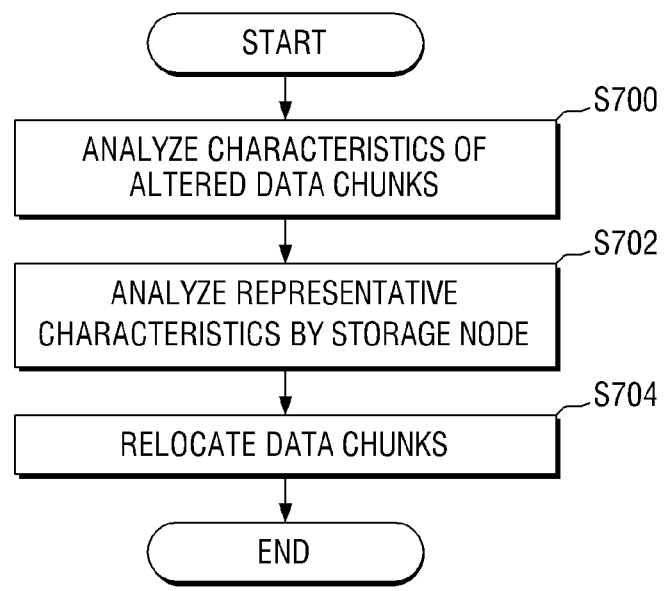
FIG. 15 is a flowchart for explaining a process of redistributing an altered data chunk in a storage node.

FIG. 14 is a flowchart for explaining a distributed storage method according to an embodiment of the present disclosure, and FIG. 15 is a flowchart for explaining a process of redistributing an altered data chunk in a storage node.

Referring to FIG. 14, in the distributed storage method according to an embodiment of the present disclosure, data write requests are received from clients (S600), and data requested to write is separated into data chunks (S602). If the data chunks have not already been allocated to global address spaces (N (no) in S604), characteristics of the data chunks are analyzed (S606), a storage node for storing the data chunks is selected (S608), metadata is renewed and the data chunks are stored (S610). If the data chunks have already been allocated to global address spaces (Y (yes) in S604), it is determined whether to update all of the data chunks. If the data chunks have not been updated (N in S612), only metadata is renewed (S620). If the data chunks have been updated (Y in S612), characteristics of the updated data chunks are analyzed (S614), a storage node for storing the data chunks is selected (S616), metadata is renewed and the data chunks are stored (S618).

Referring to FIG. 15, relocating the altered data chunks in the storage node includes analyzing characteristics of the altered data chunks (S700), analyzing representative characteristics by storage node (S702), and relocating data chunks (S704).

According to various embodiments of the present disclosure, data requested to input/output by clients is processed in basic units of data chunks having multiple data input/output unit blocks having smaller sizes (referred to as "super chunks"). That is to say, one bout of input/output operation is also processed based on the sizes of the data chunks, and address regions are also set based on the sizes of the data chunks. Therefore, distributed data storage can be processed while maintaining a small number of entries of the address mapping table, thereby saving spaces required for storing metadata, and so on. In addition, data input/output requests made in continuous address spaces can be expected to be efficiently processed by securing data proximity in a data chunk.

Meanwhile, since data chunks are not randomly allocated in distributed storage nodes but are arranged for data having similar patterns to be adjacent to each other based on characteristics or patterns of the data pre-stored in the storage nodes, duplication of similar data may also be eliminated.

While the present disclosure has been particularly shown and described with reference to example embodiments thereof, it will be understood by those of ordinary skill in the art that various changes in form and details may be made therein without departing from the spirit and scope of the present disclosure as defined by the following claims. It is therefore desired that the present embodiments be considered in all respects as illustrative and not restrictive, reference being made to the appended claims rather than the foregoing description to indicate the scope of the disclosure.

What is claimed is:

1. A distributed storage device comprising:
a memory configured to store computer-readable instructions; and
at least one processor configured to execute the computer-readable instructions such that the one or more processors are configured to,
separate data requested to write by clients into data chunks, the data chunks including a plurality of data input/output unit blocks,
translate first addresses generated by the data chunks into second addresses as global addresses, the global addresses being addresses used in the distributed storage device, the first addresses each including information concerning an ID, an offset, and a length of a corresponding one of the data chunks, the second addresses each including information concerning a global ID, the offset, and the length of a corresponding one of the data chunks, the global ID being an ID for identifying a corresponding one of global address spaces,
map the second addresses to a plurality of storage nodes, and
select a target storage node among the plurality of storage nodes such that the data chunks are stored in the target storage node only when the plurality of storage nodes do not have data chunks pre-stored therein and links between the second addresses and corresponding ones of data chunks pre-stored in the plurality of storage nodes are established only when the plurality of storage nodes have the data chunks pre-stored therein.

2. The distributed storage device of claim 1, wherein the at least one processor is configured to store the data chunks in the target storage node when the plurality of storage nodes does not have the data chunks pre-stored therein.

3. The distributed storage device of claim 1, wherein each of the data chunks is a combination of the plurality of data input/output unit blocks that are sequentially and consecutively arranged in the data requested to write by the clients.

4. The distributed storage device of claim 1, wherein areas addressed by the global addresses have a same size as the data chunks.

5. The distributed storage device of claim 1, wherein:
the data chunks include a first data chunk and a second data chunk,
the global addresses include,
a first global address for addressing the first data chunk, and
a second global address for addressing the second data chunk, and
when the first data chunk and the second data chunk are equal to each other, the at least one processor is further configured to address a same storage node as the first global address and the second global address.

6. The distributed storage device of claim 1, wherein for each of the plurality of storage nodes,
the at least one processor is further configured to,
analyze data similarity between the data chunks pre-stored in the plurality of storage nodes and the data chunks for the data requested to write, and
select one of the plurality of storage nodes having a highest data similarity as the target storage node.

7. The distributed storage device of claim 6, wherein for each of the plurality of storage nodes,
the at least one processor is further configured to,
generate data having a representative distribution characteristic based on distribution characteristics of the data chunks pre-stored in each of the plurality of storage nodes,
analyze data similarity between the data having the representative distribution characteristic and the data chunks for the data requested to write, and
select a storage node having a highest data similarity as the target storage node.

8. The distributed storage device of claim 6, wherein the plurality of storage nodes include a first storage node and a second storage node,
the data chunks include a first data chunk stored in the first storage node and a second data chunk in the second storage node, and
when the first data chunk stored in the first storage node is altered, the at least one processor is further configured to,
re-analyze the data similarity between the data having a representative distribution characteristic of each of the plurality of storage nodes and the first data chunk, and
migrate the first data chunk to one of the plurality of storage nodes having a highest data similarity.

9. The distributed storage device of claim 8, wherein when the first data chunk is partially altered, the at least one processor is further configured to retain the partially altered first data chunk in the first storage node.

10. The distributed storage device of claim 6, wherein the at least one processor is further configured to,
periodically perform clustering on the data chunks stored in the plurality of storage nodes, and
relocate the data chunks stored in the plurality of storage nodes according to the data similarity.

11. The distributed storage device of claim 1, wherein the at least one processor is further configured to translate between the first addresses and the second addresses, and map the storage node to the second addresses using at least one database table.

12. The distributed storage device of claim 1, wherein the data input/output unit blocks have sizes of 4 KB to 8 KB, and
the data chunks have a size of 1 MB or greater.

13. A distributed storage device comprising:
a memory configured to store computer-readable instructions; and
one or more processors configured to execute the computer-readable instructions such that the one or more processors are configured to,
separate data requested to write by clients into data chunks and map the data chunks to global address spaces, the data chunks including a plurality of data input/output unit block,
map a plurality of storage nodes to global addresses for the data chunks mapped to the global address spaces,
map a plurality of storage nodes to global addresses for the data chunks mapped to the global address spaces, the global addresses each including information concerning a global ID, an offset, and a length of a corresponding one of the data chunks, the global ID being an ID for identifying a corresponding one of the global address spaces, and
establish, only when the data requested to write by the clients into the data chunks are same as data chunks pre-stored in the plurality of storage nodes, links between the global addresses and the data chunks pre-stored in the plurality of storage nodes to perform data input/output operations for the data chunks on the pre-stored data chunks.

14. The distributed storage device of claim 13, further comprising:
a buffer configured to buffer the data chunks,
wherein the one or more processors are further configured to perform the data input/output operations for the data chunks using the data chunks buffered in the buffer when the data requested to write by the clients into the data chunks are same as the data chunks pre-stored in the buffer.

15. The distributed storage device of claim 13, wherein each of the data chunks is a combination of the plurality of data input/output unit blocks that are sequentially and consecutively arranged in the data requested to write, and
the one or more processors are further configured to perform the data input/output operations for the data chunks in units of sizes of the data chunks.

16. A method of storing data in a distributed storage system including a plurality of storage nodes, the method comprising:
receiving a request to write data from a client;
separating the data into data chunks;
translating first addresses generated by the data chunks into second addresses as global addresses, the global addresses being addresses used in the distributed storage system, the first addresses each including information concerning an ID, an offset, and a length of a corresponding one of the data chunks, the second addresses each including information concerning a global ID, the offset, and the length of a corresponding one of the data chunks, the global ID being an ID for identifying a corresponding one of global address spaces;
determining whether any of the plurality of storage nodes stores the same data chunks as the data chunks for the data requested to write;
storing the data chunks in one of a plurality of storage nodes only when the determining determines that the plurality of storage nodes does not have data chunks pre-stored therein; and
establishing links between addresses for the data chunks and corresponding ones of data chunks pre-stored in the plurality of storage nodes only when the determining determines that the plurality of storage nodes have the data chunks pre-stored therein.

17. The method of claim 16 further comprising:
selecting a target storage node among the plurality of storage nodes.

18. The method of claim 16 further comprising:
mapping the addresses for the data chunks to the plurality of storage nodes.

* * * * *